US009255031B2

(12) United States Patent
Pisklak et al.

(10) Patent No.: US 9,255,031 B2
(45) Date of Patent: Feb. 9, 2016

(54) TWO-PART SET-DELAYED CEMENT COMPOSITIONS

(71) Applicant: Halliburton Energy Services, Inc., Houston, TX (US)

(72) Inventors: Thomas Jason Pisklak, Cypress, TX (US); Kyriacos Agapiou, Houston, TX (US); Peter James Boul, Houston, TX (US); Pauline Akinyi Otieno, Spring, TX (US); Lance Everett Brothers, Chickasha, OK (US)

(73) Assignee: Halliburton Energy Services, Inc., Houston, TX (US)

(*) Notice: Subject to any disclaimer, the term of this patent is extended or adjusted under 35 U.S.C. 154(b) by 53 days.

(21) Appl. No.: 14/067,143

(22) Filed: Oct. 30, 2013

(65) Prior Publication Data

US 2014/0048267 A1  Feb. 20, 2014

Related U.S. Application Data

(63) Continuation-in-part of application No. 13/417,001, filed on Mar. 9, 2012, now Pat. No. 8,851,173.

(60) Provisional application No. 61/875,236, filed on Sep. 9, 2013.

(51) Int. Cl.
*C04B 7/34* (2006.01)
*E21B 33/13* (2006.01)
(Continued)

(52) U.S. Cl.
CPC . *C04B 7/34* (2013.01); *C04B 28/18* (2013.01); *C04B 40/0658* (2013.01);
(Continued)

(58) Field of Classification Search
CPC ...... C04B 14/00; C04B 16/00; C04B 22/082; C04B 28/18; C04B 40/0658; C04B 14/16; C04B 2103/12; C04B 2103/22; C04B 2103/408; C04B 22/0013; C04B 40/065; C04B 7/34; C04B 14/04; C04B 14/062; C04B 14/106; C04B 18/08; C04B 18/146; C04B 22/06; C04B 22/16; C04B 24/003; C04B 24/04; C04B 24/12; C04B 24/163; C04B 24/18; C04B 24/223; C04B 24/2641; C04B 24/383; C09K 8/46; C09K 8/467; E21B 33/13; E21B 33/138; E21B 33/14
See application file for complete search history.

(56) References Cited

U.S. PATENT DOCUMENTS 2,411,793 A   11/1946 Kennedy
2,848,051 A * 8/1958 Williams .................. 166/291
(Continued)

OTHER PUBLICATIONS

U.S. Office Action for U.S. Appl. No. 13/417,001 dated Apr. 16, 2014.
(Continued)

*Primary Examiner* — Angela M DiTrani
*Assistant Examiner* — Anuradha Ahuja
(74) *Attorney, Agent, or Firm* — Craig W. Roddy; Tumey L.L.P.

(57) ABSTRACT

A variety of methods and compositions are disclosed, including, in one embodiment a method of cementing comprising: providing a pozzolan slurry comprising a pozzolan and water; providing a lime slurry comprising hydrated lime and water; allowing the pozzolan slurry and the lime slurry to remain separate for about one day or longer; mixing the pozzolan slurry and the lime slurry to form a cement composition; and allowing the cement composition to set.

23 Claims, 2 Drawing Sheets

(51) Int. Cl.
*E21B 33/14* (2006.01)
*E21B 33/138* (2006.01)
*C04B 28/18* (2006.01)
*C04B 40/06* (2006.01)

(52) U.S. Cl.
CPC .............. *E21B 33/13* (2013.01); *E21B 33/138* (2013.01); *E21B 33/14* (2013.01); *Y02W 30/92* (2015.05); *Y02W 30/94* (2015.05)

(56) References Cited

U.S. PATENT DOCUMENTS

| | | | |
|---|---|---|---|
| 3,557,876 A | 1/1971 | Tragesser | |
| 3,699,042 A | 10/1972 | Browning et al. | |
| 3,887,009 A | 6/1975 | Miller et al. | |
| 3,959,003 A | 5/1976 | Ostroot et al. | |
| 4,054,462 A | 10/1977 | Stude | |
| 4,274,881 A * | 6/1981 | Langton et al. | 106/698 |
| 4,349,443 A | 9/1982 | Block | |
| 4,350,533 A | 9/1982 | Galer et al. | |
| 4,462,837 A * | 7/1984 | Baker et al. | 106/720 |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs et al. | |
| 4,818,288 A | 4/1989 | Aignesberger et al. | |
| 4,875,937 A | 10/1989 | Viles | |
| 5,058,679 A | 10/1991 | Hale et al. | |
| 5,263,542 A | 11/1993 | Brothers | |
| 5,314,022 A | 5/1994 | Cowan et al. | |
| 5,447,197 A | 9/1995 | Rae et al. | |
| 5,501,277 A | 3/1996 | Onan | |
| 5,503,671 A | 4/1996 | Casabonne et al. | |
| 5,547,506 A | 8/1996 | Rae et al. | |
| 6,173,778 B1 | 1/2001 | Rae et al. | |
| 6,333,005 B1 | 12/2001 | Nguyen et al. | |
| 6,457,523 B1 | 10/2002 | Vijn et al. | |
| 6,488,762 B1 | 12/2002 | Shi | |
| 6,610,140 B2 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,244,303 B2 | 7/2007 | Chatterji et al. | |
| 7,338,923 B2 | 3/2008 | Roddy et al. | |
| 7,445,669 B2 | 11/2008 | Roddy et al. | |
| 7,478,675 B2 | 1/2009 | Roddy et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,617,870 B1 | 11/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,851,173 B2 * | 10/2014 | Brothers et al. | 166/292 |
| 8,899,329 B2 | 12/2014 | Chatterji et al. | |
| 8,910,708 B2 | 12/2014 | Chatterji et al. | |
| 2002/0050232 A1 * | 5/2002 | Yamashita et al. | 106/802 |
| 2002/0162657 A1 | 11/2002 | Tumlin et al. | |
| 2003/0121456 A1 | 7/2003 | Griffith et al. | |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 * | 7/2004 | Goodwin | 524/2 |
| 2004/0211342 A1 | 10/2004 | Sprouts et al. | |
| 2004/0226484 A1 | 11/2004 | Chatterji et al. | |
| 2005/0079016 A1 | 4/2005 | Greenwood et al. | |
| 2006/0025312 A1 * | 2/2006 | Santra | C09K 8/16 507/269 |
| 2006/0041060 A1 * | 2/2006 | George et al. | 525/56 |
| 2006/0054320 A1 | 3/2006 | Brothers et al. | |
| 2006/0108150 A1 * | 5/2006 | Luke | C04B 14/047 175/64 |
| 2006/0166834 A1 | 7/2006 | Roddy et al. | |
| 2006/0249054 A1 | 11/2006 | Brothers et al. | |
| 2006/0249289 A1 | 11/2006 | Brothers et al. | |
| 2007/0051280 A1 | 3/2007 | Fyten | |
| 2007/0089643 A1 | 4/2007 | Roddy et al. | |
| 2007/0125534 A1 | 6/2007 | Reddy et al. | |
| 2007/0235192 A1 | 10/2007 | Michaux et al. | |
| 2007/0289744 A1 | 12/2007 | Bringamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0020044 A1 * | 1/2009 | Constantz et al. | 106/738 |
| 2009/0038800 A1 * | 2/2009 | Ravi et al. | 166/292 |
| 2009/0105099 A1 | 4/2009 | Warrender et al. | |
| 2009/0124522 A1 | 5/2009 | Roddy | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 * | 2/2010 | Roddy et al. | 166/294 |
| 2010/0258312 A1 | 10/2010 | Brenneis et al. | |
| 2010/0270016 A1 | 10/2010 | Carelli et al. | |
| 2010/0273912 A1 | 10/2010 | Roddy et al. | |
| 2010/0282466 A1 | 11/2010 | Brenneis et al. | |
| 2010/0313795 A1 | 12/2010 | Guynn et al. | |
| 2011/0017452 A1 | 1/2011 | Benkley et al. | |
| 2011/0132605 A1 | 6/2011 | Sarap et al. | |
| 2011/0162845 A1 | 7/2011 | Ravi | |
| 2011/0305830 A1 | 12/2011 | Frantz et al. | |
| 2012/0018155 A1 | 1/2012 | Patil | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0249552 A1 | 10/2012 | Harvill et al. | |
| 2012/0251079 A1 | 10/2012 | Meschter et al. | |
| 2012/0252304 A1 | 10/2012 | Vaughan | |
| 2012/0291674 A1 | 11/2012 | Brenneis et al. | |
| 2012/0325478 A1 | 12/2012 | Muthusamy et al. | |
| 2013/0043026 A1 | 2/2013 | Taoutaou | |
| 2013/0233550 A1 | 9/2013 | Brothers et al. | |
| 2013/0248183 A1 | 9/2013 | Pisklak | |
| 2014/0000893 A1 | 1/2014 | Lewis et al. | |
| 2014/0020895 A1 | 1/2014 | Agapiou | |
| 2014/0034313 A1 | 2/2014 | Pisklak et al. | |
| 2014/0034314 A1 | 2/2014 | Lewis et al. | |
| 2014/0083701 A1 | 3/2014 | Boul et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0202698 A1 | 7/2014 | Pisklak et al. | |
| 2014/0216746 A1 | 8/2014 | Bellew et al. | |
| 2014/0318419 A1 | 10/2014 | Chatterji et al. | |
| 2015/0175481 A1 | 6/2015 | Pisklak | |
| 2015/0175869 A1 | 6/2015 | Agapiou | |
| 2015/0197033 A1 | 7/2015 | Agapiou | |
| 2015/0197453 A1 | 7/2015 | Pisklak | |

OTHER PUBLICATIONS

HES brochure Enhancer 923™ Cement Agent, H07745 Jun. 2010.
Ramy N. EID, Liquid Cement: Changing the Paradigm, Society of Petroleum Engineers, Apr. 15, 2007.

(56) References Cited

OTHER PUBLICATIONS

Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics-Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
Notice of Allowance for U.S. Appl. No. 13/417,001 dated Mar. 9, 2012, mail date: Aug. 4, 2014.
Search Report and Written Opinion for International Application No. PCT/US2014/032150 dated Aug. 21, 2014.
Official Action for U.S. Appl. No. 14/478,869 dated Feb. 26, 2015.
Official Action for U.S. Appl. No. 14/098,198 dated Nov. 20, 2014.
Search Report and Written Opinion for International Application PCT/US14/068804 dated Mar. 17, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US2014/054794 dated Sep. 9, 2014.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for International Application PCT/US14/067112 dated Mar. 5, 2015.
Final Official Action for U.S. Appl. No. 14/098,198 dated Jun. 19, 2015.
Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Official Action for U.S. Appl. No. 14/019,730 dated Jun. 3, 2015.
Official Action for U.S. Appl. No. 14/048,486 dated Aug. 17, 2015.
Official Action for U.S. Appl. No. 14/048,463 dated Sep. 9, 2015.
Official Action for U.S. Appl. No. 14/478,813 dated Sep. 10, 2015.
Final Official Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.
Official Action for U.S. Appl. No. 14/032,734 dated Sep. 24, 2015.
Official Action for U.S. Appl. No. 14/090,494 dated Sep. 24, 2015.
Official Action for U.S. Appl. No. 14/221,479 dated Sep. 30, 2015.
Official Action for U.S. Appl. No. 14/194,125 dated Oct. 16, 2015.
Search Report and Written Opinion for International Application PCT/US15/017564 dated Jun. 3, 2015.
Search Report and Written Opinion for International Application PCT/US15/019709 dated May 22, 2015.

* cited by examiner

TWO-PART SET-DELAYED CEMENT COMPOSITIONS

CROSS-REFERENCE TO RELATED APPLICATIONS

This application claims priority to U.S. Provisional Patent Application No. 61/875,236, filed on Sep. 9, 2013, titled "Two-Part Set-Delayed Cement Compositions" and is a continuation-in-part of U.S. patent application Ser. No. 13/417,001, titled "Set-Delayed Cement Compositions Comprising Pumice and Associated Methods," filed on Mar. 9, 2012, the entire disclosures of which are incorporated herein by reference.

BACKGROUND

The present embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string prevents the migration of fluids in the annulus and protects the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, set-delayed cement compositions have been used. Set-delayed cement compositions are characterized by remaining in a pumpable fluid state for at least about one day (e.g., about 7 days, about 2 weeks, about 2 years or more) at room temperature (e.g., about 80° F.) in quiescent storage. When desired for use, the set-delayed cement compositions should be capable of activation and consequently develop reasonable compressive strengths. For example, a cement set activator may be added to a set-delayed cement composition to induce the composition to set into a hardened mass. Among other things, set-delayed cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures. In addition, it may be problematic to activate some set-delayed cement compositions while maintaining acceptable thickening times and compressive strength development.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
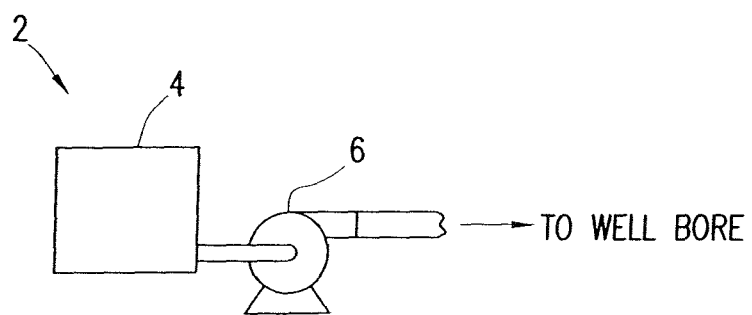
FIG. 1 illustrates a system for preparation and delivery of a set-delayed cement composition to a wellbore in accordance with certain embodiments.

The example embodiments relate to subterranean cementing operations and, more particularly, in certain embodiments, to set-delayed cement compositions and methods of using set-delayed cement compositions in subterranean formations.

Embodiments of the set-delayed cement compositions may generally comprise water, a pozzolan, and hydrated lime. Optionally, the cement compositions may further comprise a dispersant and/or a cement set retarder. Alternatively, embodiments of the set-delayed cement composition may comprise two-part set-delayed cement composition comprising separate component slurries with one component slurry comprising a pozzolan and the other component slurry comprising lime. Embodiments of the two-part set-delayed cement compositions are discussed in detail below. Advantageously, embodiments of the set-delayed cement compositions may be capable of remaining in a pumpable fluid state for an extended period of time. For example, the set-delayed cement compositions may remain in a pumpable fluid state for at least about 1 day or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments may be from any source provided that it does not contain an excess of compounds that may undesirably affect other components in the set-delayed cement compositions. For example, a cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement compositions in an amount in the range of from about 33% to about 200% by weight of the pozzolan. In certain embodiments, the water may be present in the set-delayed cement compositions in an amount in the range of from about 35% to about 70% by weight of the pozzolan. With the benefit of this disclosure one of ordinary skill in the art will recognize the appropriate amount of water for a chosen application.

Embodiments of the set-delayed cement compositions may comprise a pozzolan. Any pozzolan is suitable for use in embodiments. Example embodiments comprising a pozzolan may comprise fly ash, silica fume, metakaolin, a natural pozzolan (e.g., pumice), or combinations thereof.

Embodiments of the pozzolan may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a set-delayed cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash include, but are not limited to, POZMIX® A cement additive, commercially available from Halliburton Energy Services, Inc., Houston, Tex.

Embodiments of the pozzolan may comprise metakaolin. Generally, metakaolin is a white pozzolan that may be prepared by heating kaolin clay, for example, to temperatures in the range of about 600° C. to about 800° C.

Embodiments of the pozzolan may comprise a natural pozzolan. Natural pozzolans are generally present on the Earth's surface and set and harden in the presence of hydrated lime and water. Embodiments comprising a natural pozzolan may comprise pumice, diatomaceous earth, volcanic ash, opaline shale, tuff, and combinations thereof. The natural pozzolans may be ground or unground. Generally, the natural pozzolans may have any particle size distribution as desired for a particular application. In certain embodiments, the natural pozzolans may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the natural pozzolans may have a mean particle size in a range of from about 1 micron to about 200 micron, from about 5 microns to about 100 microns, or from about 10 micron to about 50 microns. In one particular embodiment, the natural pozzolans may have a mean particle size of less than about 15 microns. An example of a suitable commercial natural pozzolan is pumice available from Hess Pumice Products, Inc., Malad, Id., as DS-325 lightweight aggregate, which has a particle size of less than about 15 microns. It should be appreciated that particle sizes too small may have mixability problems while particle sizes too large may not be effectively suspended in the compositions and may be less reactive due to their decreased surface area. One of ordinary skill in the art, with the benefit of this disclosure, should be able to select a particle size for the natural pozzolans suitable for use for a chosen application.

Embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments, for example, to form a hydraulic composition with the pozzolan. For example, the hydrated lime may be included in a pozzolan-to-hydrated-lime weight ratio of about 10:1 to about 1:1 or a ratio of about 3:1 to about 5:1. Where present, the hydrated lime may be included in the set-delayed cement compositions in an amount in the range of from about 10% to about 100% by weight of the pozzolan, for example. In some embodiments, the hydrated lime may be present in an amount ranging between any of and/or including any of about 10%, about 20%, about 40%, about 60%, about 80%, or about 100% by weight of the pozzolan. In some embodiments, the cementitious components present in the set-delayed cement composition may consist essentially of the pozzolan and the hydrated lime. For example, the cementitious components may primarily comprise the pozzolan and the hydrated lime without any additional cementitious components (e.g., Portland cement) that hydraulically set in the presence of water. One of ordinary skill in the art, with the benefit of this disclosure, will recognize the appropriate amount of hydrated lime to include for a chosen application.

Embodiments of the set-delayed cement compositions may comprise a cement set retarder. A broad variety of cement set retarders may be suitable for use in the set-delayed cement compositions. For example, the cement set retarder may comprise phosphonic acids, such as ethylenediamine tetra(methylene phosphonic acid), diethylenetriamine penta (methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxylethyl cellulose (HEC) and carboxymethyl hydroxyethyl cellulose (CM-HEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable cement set retarders include, among others, phosphonic acid derivatives. One example of a suitable cement set retarder is Micro Matrix® cement retarder, available from Halliburton Energy Services, Inc. Generally, the cement set retarder may be present in the set-delayed cement compositions in an amount sufficient to delay the setting for a desired time. In some embodiments, the cement set retarder may be present in the set-delayed cement compositions in an amount in the range of from about 0.01% to about 10% by weight of the pozzolan. In specific embodiments, the cement set retarder may be present in an amount ranging between any of and/or including any of about 0.01%, about 0.1%, about 1%, about 2%, about 4%, about 6%, about 8%, or about 10% by weight of the pozzolan. One of ordinary skill in the art, with the benefit of this disclosure, will recognize the appropriate amount of the cement set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain cement set retarders (e.g., phosphonic acid derivatives) resulting in formation of a gel that suspends the pozzolan and hydrated lime in the composition for an extended period of time.

In some embodiments, the dispersant may be included in the set-delayed cement compositions in an amount in the range of from about 0.01% to about 5% by weight of the pozzolan. In specific embodiments, the dispersant may be present in an amount ranging between any of and/or including any of about 0.01%, about 0.1%, about 0.5%, about 1%, about 2%, about 3%, about 4%, or about 5% by weight of the pozzolan. One of ordinary skill in the art, with the benefit of this disclosure, will recognize the appropriate amount of the dispersant to include for a chosen application.

Some embodiments of the set-delayed cement compositions may comprise silica sources in addition to the pozzolan; for example, crystalline silica and/or amorphous silica. Crystalline silica is a powder that may be included in embodiments of the set-delayed cement compositions, for example, to prevent cement compressive strength retrogression. Amorphous silica is a powder that may be included in embodiments of the set-delayed cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. An example of a suitable source of amorphous silica is Silicalite™ cement additive available from Halliburton Energy Services, Inc., Houston, Tex. Embodiments comprising additional silica sources may utilize the additional silica source as needed to enhance compressive strength or set times.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the cement compositions may have a density in the range of from about 4 pounds per gallon ("lb/gal") to about 20 lb/gal. In certain embodiments, the cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the set-delayed cement compositions. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with a cement set activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the cement set activator may be provided and added to the set-delayed cement composition as a liquid additive, for example, a liquid additive comprising a monovalent salt, a polyphosphate, and optionally a dispersant.

The cement set activator should be added to embodiments of the set-delayed cement composition in an amount sufficient to induce the set-delayed composition to set into a hardened mass. In certain embodiments, the cement set activator may be added to the cement composition in an amount in the range of about 0.1% to about 20% by weight of the pozzolan. In specific embodiments, the cement set activator may be present in an amount ranging between any of and/or including any of about 0.1%, about 1%, about 5%, about 10%, about 15%, or about 20% by weight of the pozzolan. One of ordinary skill in the art, with the benefit of this disclosure, will recognize the appropriate amount of the cement set activator to include for a chosen application.

Embodiments of the set-delayed cement compositions may comprise the use of two separate component slurries that are combined to form a two-part set-delayed cement composition. Embodiments of the two-part set-delayed cement may comprise providing a pozzolan slurry and a lime slurry which are kept separate in lieu of adding cement set retarders. The two-part set-delayed cement composition may utilize two individual slurries in a manner such that neither slurry is able to hydrate and therefore set independently. Therefore, each individual slurry of the two-part set-delayed cement composition should remain in a set-delayed state (i.e. remaining in a pumpable fluid state for at least about one day [e.g., at least about 1 day, about 2 weeks, about 2 years or more] at room temperature in quiescent storage). Embodiments of the two-part set-delayed cement composition may comprise two component slurries. One component slurry comprises a pozzolan and water. The other component slurry comprises lime and water. In embodiments, each slurry may be stored at a well site or other storage site until needed. When needed, the two component slurries may be mixed together prior to or while pumping downhole. The combined slurry may then thicken and set within a desired period of time.

Advantageously, the use of a two-part set-delayed cement composition may allow for quicker setting at lower temperatures (e.g. temperatures less than 140° F.). Furthermore, because the reactive components of the two-part set-delayed cement composition are kept separate, additional additives or higher concentrations of additives (e.g. additional silica sources, see above) may be added to the two-part set-delayed cement composition without risk of premature setting or gelation.

Embodiments of the two-part set-delayed cement compositions may generally comprise two component slurries, a pozzolan slurry and a lime slurry. Both component slurries comprise water. Optionally, either component slurry may further comprise a dispersant and/or a cement set retarder. Advantageously, embodiments of the two-part set-delayed cement compositions may be capable of remaining in a pumpable fluid state for an extended period of time. For example, the two-part set-delayed cement compositions may remain in a pumpable fluid state for at least about 1 day or longer. Advantageously, the two-part set-delayed cement compositions may develop reasonable compressive strengths after activating (e.g. by mixing the two component slurries) at relatively low temperatures. While the two-part set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

Embodiments of the pozzolan slurry comprise a pozzolan. Any pozzolan is suitable for use in embodiments. Example embodiments comprising a pozzolan may comprise fly ash, silica fume, metakaolin, diatomaceous earth, a natural pozzolan (e.g., pumice), or combinations thereof. In a two-part set-delayed cement composition embodiment, the pozzolan may be a non-hydraulic pozzolan, i.e. a pozzolan that will not react when mixed with water in the absence of hydrated lime to form a cementitious material. By way of example, some types of Class C fly ash may not be suitable for use in a two-part set-delayed cement composition embodiment, because Class C fly ash may comprise lime and will therefore react when mixed with water to become cementitious.

Embodiments of the pozzolan slurry may comprise fly ash. A variety of fly ashes may be suitable, including fly ash classified as Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water and may thus be unsuitable for use in the pozzolan slurry as it may undesirably set when mixed with the water. Class F fly ash generally does not contain a sufficient amount of lime to induce a cementitious reaction, therefore, should remain in a pumpable fluid state when mixed with water. Suitable examples of fly ash include, but are not limited to, POZMIX® A cement additive, commercially available from Halliburton Energy Services, Inc., Houston, Tex.

Embodiments of the pozzolan slurry may comprise metakaolin. Generally, metakaolin is a white pozzolan that may be prepared by heating kaolin clay, for example, to temperatures in the range of about 600° C. to about 800° C.

Embodiments of the pozzolan slurry may comprise a natural pozzolan. Natural pozzolans are generally present on the Earth's surface and set and harden in the presence of hydrated lime and water. Embodiments comprising a natural pozzolan may comprise pumice, diatomaceous earth, volcanic ash, opaline shale, tuff, and combinations thereof. The natural pozzolans may be ground or unground. Generally, the natural pozzolans may have any particle size distribution as desired for a particular application. In certain embodiments, the natural pozzolans may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the natural pozzolans may have a mean particle size in a range of from about 1 micron to about 200 micron, from about 5 microns to about 100 microns, or from about 10 micron to about 50 microns. In one particular embodiment, the natural pozzolans may have a mean particle size of less than about 15 microns. An example of a suitable commercial natural pozzolan is pumice available from Hess Pumice Products, Inc., Malad, Id., as DS-325 lightweight aggregate, which has a particle size of less than about 15 microns. It should be appreciated that particle sizes too small may have mixability problems while particle sizes too large may not be effectively suspended in the compositions and may be less reactive due to their decreased surface area. One of ordinary skill in the art, with the benefit of this disclosure, should be able to select a particle size for the natural pozzolans suitable for use for a chosen application.

Embodiments of the pozzolan slurry comprise water. The water used in embodiments of the pozzolan slurry may be from any source provided that it does not contain an excess of compounds that may undesirably affect other components in the pozzolan slurry. For example, the pozzolan slurry may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be individually present in the pozzolan slurry in an amount in the range of from about 33% to about 200% by weight of the pozzolan. In certain embodiments, the water may be present in the pozzolan slurry in an amount in the range of from about 35% to about 85% by weight of the pozzolan. With the benefit of this disclosure one of ordinary skill in the art will recognize the appropriate amount of water for a chosen application. Embodiments of the pozzolan slurry may comprise additives suitable for use in subterranean cementing operations. Any additive, including additional silica sources, may be added to the pozzolan slurry. Examples of additives include, but are not limited to: weighting additives, lightweight additives, gas-generating additives, mechanical-property-enhancing additives, lost-circulation materials, filtration-control additives, fluid-loss-control additives, defoaming agents, foaming agents, thixotropic additives, dispersants, cement set activators/accelerators, cement set retarders, and combinations thereof. In embodiments of the pozzolan slurry, one or more of these additives may be added to the pozzolan slurry before or after storing. Additionally one or more of these additives may be added to the pozzolan slurry before or after mixing the pozzolan slurry with the lime slurry. A person having ordinary skill in the art, with the benefit of this disclosure, should readily be able to determine the type and amount of additive useful for a particular application and desired result.

Embodiments of the lime slurry comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the lime slurry to form a hydraulic composition with the pozzolan. For example, the hydrated lime may be included in a pozzolan-to-hydrated-lime weight ratio of about 10:1 to about 1:1 or a ratio of about 3:1 to about 5:1, based on the combined mix of both component slurries. Where present, the lime slurry may comprise an amount of hydrated lime between about 10% to about 100% by weight of the pozzolan present in the pozzolan slurry. In some embodiments, the hydrated lime may be present in the lime slurry in an amount ranging between any of and/or including any of about 10%, about 20%, about 40%, about 60%, about 80%, or about 100% by weight of the pozzolan in the pozzolan slurry. In some embodiments, the cementitious components present in the two-part set-delayed cement composition may consist essentially of the pozzolan and the hydrated lime. For example, the cementitious components may primarily comprise the pozzolan (e.g., pumice) and the hydrated lime without any additional cementitious components (e.g., Portland cement) that hydraulically set in the presence of water. One of ordinary skill in the art, with the benefit of this disclosure, will recognize the appropriate amount of hydrated lime to include for a chosen application.

Embodiments of the lime slurry comprise water. The water used in embodiments of the lime slurry may be from any source provided that it does not contain an excess of compounds that may undesirably affect other components in the lime slurry. For example, the lime slurry may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be individually present in the lime slurry in an amount in the range of from about 33% to about 200% by weight of the lime. In certain embodiments, the water may be present in the lime slurry in an amount in the range of from about 35% to about 70% by weight of the lime. With the benefit of this disclosure one of ordinary skill in the art will recognize the appropriate amount of water for a chosen application.

Embodiments of the lime slurry may comprise additives suitable for use in subterranean cementing operations. Any additive, including additional silica sources, may be added to the lime slurry. Examples of such additives include, but are not limited to: weighting additives, lightweight additives, gas-generating additives, mechanical-property-enhancing additives, lost-circulation materials, filtration-control additives, fluid-loss-control additives, defoaming agents, foaming agents, thixotropic additives, dispersants, cement set activators/accelerators, cement set retarders, and combinations thereof. In embodiments of the lime slurry, one or more of these additives may be added to the lime slurry before or after storing. Additionally one or more of these additives may be added to the lime slurry before or after mixing the lime slurry with the pozzolan slurry. A person having ordinary skill in the art, with the benefit of this disclosure, should readily be able to determine the type and amount of additive useful for a particular application and desired result.

Embodiments of the two-part set-delayed cement compositions may comprise a cement set retarder as described above. Any cement set retarder described in embodiments of the set-delayed cement compositions above may also be suitable for embodiments of the two-part set-delayed cement compositions. Cement set retarders may be added to one or both component slurries or may be added to the combined slurry. Amongst other reasons, cement set retarders may be added to increase thickening time. In some embodiments, the cement set retarder may be present in the component slurries (either individually or in both) or in the combined slurry of the two-part set-delayed cement compositions in an amount in the range of from about 0.01% to about 10% by weight of the pozzolan. In specific embodiments, the cement set retarder may be present in an amount ranging between any of and/or including any of about 0.01%, about 0.1%, about 1%, about 2%, about 4%, about 6%, about 8%, or about 10% by weight of the pozzolan for the pozzolan slurry or by weight of the lime for the lime slurry. One of ordinary skill in the art, with the benefit of this disclosure, will recognize the appropriate amount of the cement set retarder to include for a chosen application.

As previously mentioned, embodiments of the two-part set-delayed cement compositions may optionally comprise a dispersant as described above. Any dispersant described in embodiments of the set-delayed cement compositions may also be suitable for embodiments of the two-part set-delayed cement compositions. In some embodiments, the dispersant may be included in one or both of the component slurries or in the combined slurry of the two-part set-delayed cement compositions in an amount in the range of from about 0.01% to about 5% by weight of the pozzolan or the hydrated lime. In specific embodiments, the dispersant may be present in an amount ranging between any of and/or including any of about 0.01%, about 0.1%, about 0.5%, about 1%, about 2%, about 3%, about 4%, or about 5% by weight of the pozzolan or the hydrated lime. One of ordinary skill in the art, with the benefit of this disclosure, will recognize the appropriate amount of the dispersant to include for a chosen application.

Embodiments may include the addition of a cement set activator to the two-part set-delayed cement compositions as described above. The cement set activator may be included to accelerate setting times, amongst other reasons. Any cement set activator described in embodiments of the set-delayed cement compositions may also be suitable for embodiments of the two-part set-delayed cement compositions. Any cement set activator may be added to either one or both of the component slurries as well as to the combined slurry in an amount sufficient to accelerate the setting of the combined two-part set-delayed composition (if added to only a component slurry, the acceleration of the set time should happen when the component slurries are mixed). In embodiments, the cement set activator may be added to the component slurries (either individually or both) or to the combined slurry of the two-part set-delayed cement composition in an amount in the range of about 0.1% to about 20% by weight of the pozzolan. In specific embodiments, the cement set activator may be present in the component slurries (either individually or in both) or in the combined slurry of the two-part set-delayed cement composition in an amount ranging between any of and/or including any of about 0.1%, about 1%, about 5%, about 10%, about 15%, or about 20% by weight of the pozzolan. One of ordinary skill in the art, with the benefit of this disclosure, will recognize the appropriate amount of the cement set activator to include for a chosen application.

Those of ordinary skill in the art will appreciate that embodiments of the two-part set-delayed cement compositions generally should have a density suitable for a particular application. By way of example, the combined two-part set-delayed cement compositions may have a density in the range of from about 4 pounds per gallon ("lb/gal") to about 20 lb/gal. In certain embodiments, the combined two-part set-delayed cement compositions may have a density in the range of from about 8 lb/gal to about 17 lb/gal. Embodiments of the two-part set-delayed cement compositions may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the two-part set-delayed cement compositions. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, will recognize the appropriate density for a particular application.

As previously mentioned, the component slurries of the two-part set-delayed cement compositions may have a delayed set in that they remain in a pumpable fluid state for at least one day (e.g., about 1 day, about 2 weeks, about 2 years or more) at room temperature (e.g., about 80° F.) in quiescent storage. For example, the component slurries of the two-part set-delayed cement compositions may remain in a pumpable fluid state for a period of time from about 1 day to about 7 days or more. In some embodiments, the component slurries of the two-part set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the two-part set-delayed cement compositions may be activated (e.g., by combining the pozzolan and lime slurries) to set into a hardened mass. By way of example, embodiments of the two-part set-delayed cement compositions may be activated to form a hardened mass in a time period in the range of from about 1 hour to about 12 hours. For example, embodiments of the two-part set-delayed cement compositions may set to form a hardened mass in a time period ranging between any of and/or including any of about 1 day, about 2 days, about 4 days, about 6 days, about 8 days, about 10 days, or about 12 days.

In some embodiments, the two-part set-delayed cement compositions may set to have a desirable compressive strength after activation. Compressive strength is generally the capacity of a material or structure to withstand axially directed pushing forces. The compressive strength may be measured at a specified time after the two-part set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the two-part set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the two-part set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the two-part set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the two-part set-delayed cement compositions may have a thickening time of greater than about 1 hour, alternatively, greater than about 2 hours, alternatively greater than about 5 hours at between about 1,000 psi to about 20,000 psi and temperatures in a range of from about 50° F. to about 400° F., alternatively, in a range of from about 80° F. to about 250° F., and alternatively at a temperature of about 140° F.

Embodiments of the two-part set-delayed cement composition may be used to displace a prior placed fluid (i.e. embodiments of the two-part set-delayed cement composition may be used as a spacer fluid). The pozzolan slurry of the two-part set-delayed cement composition, comprising a pozzolan and water, may be similar in composition to conventional spacer fluids. Because of this similarity, the pozzolan slurry may be used as a spacer fluid in embodiments. The pozzolan slurry may be used to displace a drilling mud, separate cement from a drilling mud, displace another treatment fluid, separate the drilling mud from a treatment fluid, and/or separate cement from a treatment fluid. Advantageously, the use of the pozzolan slurry as a spacer fluid may condition the subterranean formation with part of the same composition that ultimately may be used as the annular sealant. Therefore, the risk of incompatibilities between sealant and spacer fluid may be reduced.

In embodiments wherein the pozzolan component slurry of the two-part set-delayed cement composition may be used as a spacer fluid, the density of the pozzolan slurry may be adjusted by the addition of water and/or a viscosifier. The water and viscosifiers may be added in any amount to achieve the appropriate density to provide a suitable rheological hierarchy for a given application. An example of a suitable viscosifier is SA-1015™ suspending agent available from Halliburton Energy Services, Houston, Tex. Additionally, weighting agents may be added to adjust the density as may be appropriate to maintain a suitable rheological hierarchy. One of ordinary skill in the art, with the benefit of this disclosure, will recognize the appropriate density and method of density adjustment necessary for a chosen application.

Moreover, in embodiments wherein the pozzolan slurry may be used as a spacer fluid, the spacer fluid may be foamed with a foaming additive and/or a gas. The spacer fluid may be foamed, for example, to provide a spacer fluid with a reduced density. The gas used for foaming the composition may be any suitable gas for foaming, including, but not limited to: air, nitrogen, or combinations thereof. Generally, the gas should be present in an amount sufficient to form the desired amount or quality of foam. Foaming additives may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

It is to be understood, that any additive, component, or embodiment disclosed herein may additionally be used or combined with embodiments of the two-part set-delayed cement composition. For example, previously described additives such as weighting agents, lightweight additives, gas-generating additives, mechanical-property-enhancing additives, lost-circulation materials, filtration-control additives, fluid-loss-control additives, defoaming agents, foaming agents, thixotropic additives, dispersants, cement set retarders, cement set activators/accelerators, additional silica sources, and the like, and combinations thereof may all be used with embodiments of the pozzolan slurry, lime slurry, and the combined slurry of the two-part set-delayed cement compositions in the same manner as previously described. The two-part set-delayed cement composition embodiment is therefore inclusive of every additive, component, or other embodiment that may be used in combination; including the use of cement set activators and cement set retarders. For example, the two-part set-delayed cement composition may comprise a cement set activator to accelerate setting time and enhance early strength, additionally or alternatively, the two-part set-delayed cement composition may comprise a cement set retarder to delay thickening time. Any additive, component, or embodiment disclosed herein may be added to one or both of the component slurries or to the combined slurry of the two-part set-delayed cement compositions. Moreover, any additive, component, or embodiment disclosed herein that is used with the pozzolan slurry, the lime slurry, or the combined slurry may also be used with embodiments of the two-part set-delayed cement composition that comprise a spacer fluid.

As will be appreciated by those of ordinary skill in the art, embodiments of the set-delayed cement compositions including the two-part set-delayed cement compositions may be used in a variety of subterranean operations, including primary and remedial cementing. In some embodiments, a set-delayed cement composition (in the two-part set-delayed cement composition embodiments, this may be a combined two-part set-delayed cement composition) may be provided that comprises water, a pozzolan, hydrated lime, a cement set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, addition of a cement set accelerator to the set-delayed cement composition or the mixing of the two component slurries of the two-part set-delayed cement composition.

In some embodiments, a set-delayed cement composition may be provided that comprises water, a pozzolan, hydrated lime, a cement set retarder, and optionally a dispersant. The set-delayed cement composition may be stored, for example, in a vessel or other suitable container. In alternative embodiments a two-part set-delayed cement composition may be provided that comprises a first part comprising a pozzolan and water component slurry and a second part comprising a hydrated lime and water component slurry. The first and second parts may individually stored and combined prior to or while pumping downhole. The set-delayed cement compositions may be permitted to remain in storage for a desired time period. For example, the set-delayed cement compositions may remain in storage for a time period of about 1 day, about 2 weeks, about 2 years, or longer. For example, the set-delayed cement compositions may remain in storage for a time period of about 1 day, about 2 days, about 5 days, about 7 days, about 10 days, about 20 days, about 30 days, about 40 days, about 50 days, about 60 days, or up to about 2 years. In some embodiments, the set-delayed cement composition may remain in storage for a time period in a range of from about 1 day to about 2 years or longer. Thereafter, the set-delayed cement composition may be activated, for example, by mixing the two-component slurries together, introduced into a subterranean formation, and allowed to set therein.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An embodiment comprises a method of cementing comprising: providing a pozzolan slurry comprising a pozzolan and water; providing a lime slurry comprising hydrated lime and water; allowing the pozzolan slurry and the lime slurry to remain separate for about one day or longer; mixing the pozzolan slurry and the lime slurry to form a cement composition; and allowing the cement composition to set.

An embodiment comprises a method of displacing a fluid in a subterranean formation comprising: providing a pozzolan slurry comprising a pozzolan and water; providing a lime slurry comprising hydrated lime and water; introducing at least a portion of the pozzolan slurry into a wellbore that penetrates a subterranean formation such that the pozzolan slurry displaces at least one fluid from the wellbore; activating the set-delayed cement composition by mixing at least a portion of the pozzolan slurry and at least a portion of the lime slurry to form a cement composition; introducing the cement composition into a subterranean formation; and allowing the cement composition to set in the subterranean formation.

An embodiment comprises a system for cementing comprising: a pozzolan slurry comprising a pozzolan and water; a lime slurry for combination with the pozzolan slurry to form a cement composition comprising hydrated lime and water.

Referring now to FIG. 1, preparation of a set-delayed cement composition in accordance with example embodiments will now be described. FIG. 1 illustrates a system 2 for preparation of a set-delayed cement composition and delivery to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In two-part set-delayed embodiments, mixing equipment (e.g., a jet mixer, re-circulating mixer, and/or a batch mixer) may be used to mix the combined two-part set-delayed cement composition slurry.

Figure 2A:
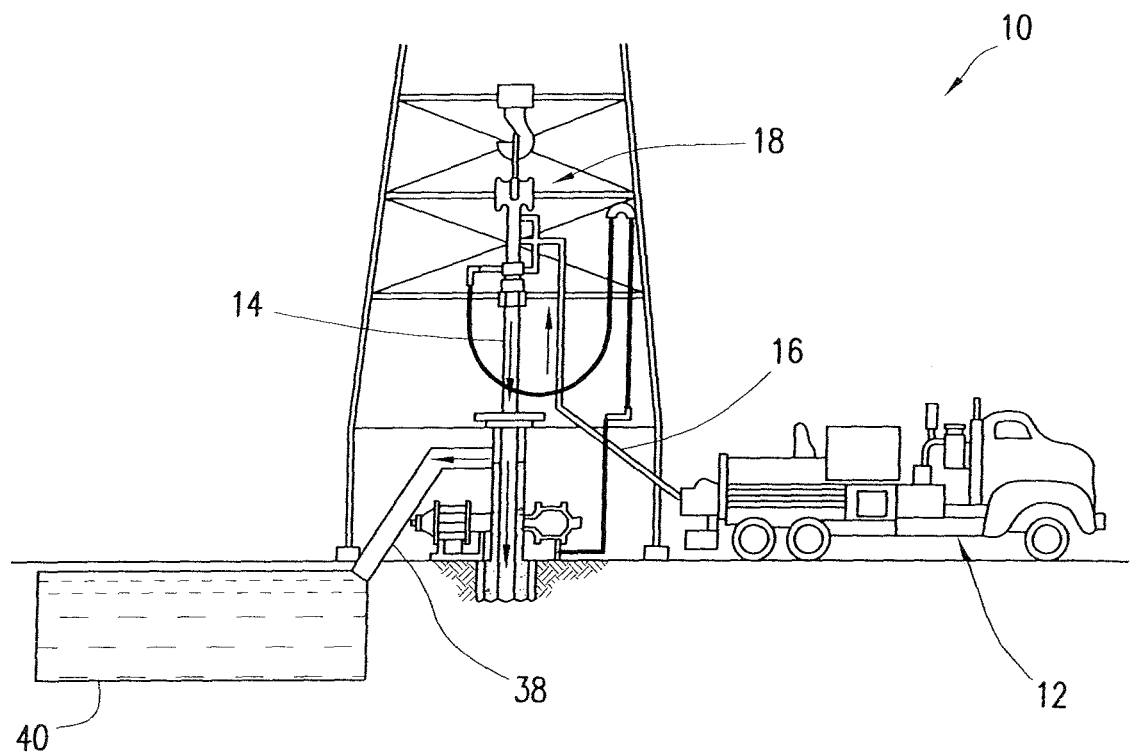
FIG. 2A illustrates surface equipment that may be used in placement of a set-delayed cement composition in a wellbore in accordance with certain embodiments.

An example technique for placing a set-delayed cement composition into a subterranean formation will now be described with reference to FIGS. 2A and 2B. FIG. 2A illustrates surface equipment 10 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 2B:
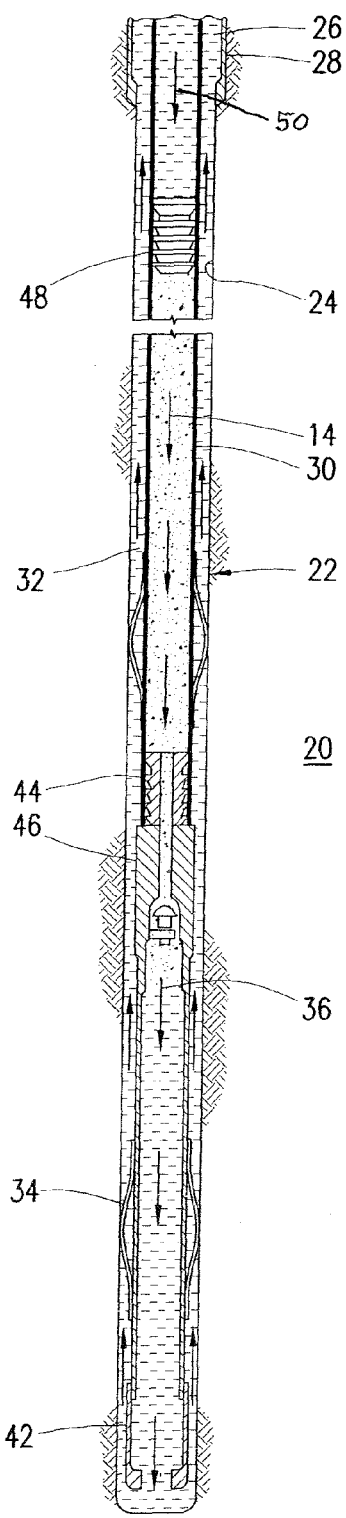
FIG. 2B illustrates placement of a set-delayed cement composition into a wellbore annulus in accordance with certain embodiments.

Turning now to FIG. 2B, the set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the set-delayed cement composition 14 may be pumped down the interior of the casing 30. The set-delayed cement composition 14 may be allowed to flow down the interior of the casing 30 through the casing shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device should rupture to allow the set-delayed cement composition 14 through the bottom plug 44. In FIG. 2B, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the entire scope of the embodiments.

Example 1

A two part set-delayed cement composition was prepared which comprised the following component slurries:

TABLE 1

| Slurry A Compositional Makeup | | Slurry B Compositional Makeup | |
|---|---|---|---|
| Component | Weight (g) | Component | Weight (g) |
| Water | 375.0 | Water | 350.0 |
| Pumice | 500.0 | Hydrated Lime | 350.0 |
| Silica Additive | 100.0 | Weighting Agent | 70.0 |
| Weighting Agent | 30.0 | Dispersant | 2.0 |
| Dispersant | 3.5 | | |

Slurry A was prepared in a Waring® blender by first adding water to the blender followed by a dispersant, Liquiment®

5581F dispersant. The dispersant was allowed to fully disperse, then the pumice, silica (Silicalite™ cement additive), and a weight additive (MicroMax® FF weight additive) were added. After all of the components were added, Slurry A was blended at a speed of 6000 rpm for 40 seconds to fully homogenize the sample. Slurry B was prepared in the same manner as Slurry A. The calculated density of Slurry A was 13.33 pounds per gallon (ppg) and Slurry B was 12.75 ppg.

Immediately after preparation (designated Day 0) and periodically thereafter, the rheological properties of the samples were determined using a Model 35A Fann Viscometer and a No. 2 spring with a Fann Yield Stress Adapter (FYSA), in accordance with the procedure set forth in API RP Practice 10B-2, *Recommended Practice for Testing Well Cements*. Dispersant was added as needed to maintain adequate viscosity values. % bwoP refers to "percent by weight of the pumice," and % bwoHL refers to "percent by weight of hydrated lime."

TABLE 2

Slurry A Rheological Profile

| | FYSA Readings | | | | | | Additional Dispersant |
|---|---|---|---|---|---|---|---|
| | 3 | 6 | 100 | 200 | 300 | 3D | 6D | (% bwoP) |
| Day 0 | 48 | 49 | 71 | 87.5 | 103 | 48 | 47 | — |
| Day 3 | 25 | 27.5 | 42 | 58.5 | 73 | 21 | 23 | 0.01 |
| Day 7 | 25.5 | 26.5 | 47.5 | 67.5 | 89 | 17 | 14 | — |
| Day 40 | 4.5 | 8 | 56 | 99 | 143 | 1 | 1 | 0.10 |

TABLE 3

Slurry B Rheological Profile

| | FYSA Readings | | | | | | Additional Dispersant |
|---|---|---|---|---|---|---|---|
| | 3 | 6 | 100 | 200 | 300 | 3D | 6D | (% bwoHL) |
| Day 0 | 25 | 27 | 41 | 57 | 78 | 10 | 10 | — |
| Day 3 | 21.5 | 23 | 80.5 | 145 | 214 | 12 | 12 | — |
| Day 7 | 22 | 26 | 80.5 | 149.5 | 220 | 12 | 12 | — |
| Day 40 | 3 | 3.5 | 16 | 23 | 30.5 | 2 | 2 | 0.02 |

To form the settable combined slurry, 129.4 grams of Slurry B was added to 500.0 grams of Slurry A. This was performed by adding Slurry A to a Waring® blender set to 4000 rpm and slowly pouring in Slurry B to form Slurry AB with a final slurry composition of:

TABLE 4

Slurry AB Compositional Makeup

| Component | % bwoP |
|---|---|
| Water | 95.0 |
| Pumice | 100.0 |
| Silica Additive | 20.0 |
| Hydrated Lime | 20.0 |
| Weight Additive | 10.0 |
| Dispersant | 0.80 |

The calculated density of Slurry AB was 13.23 ppg. A portion of Slurry AB was accelerated with 10% bwoP $CaCl_2$ by mixing 200.0 grams of Slurry AB with 21.92 grams of 43% $CaCl_2$ solution. This sample is shown in table 5 as accelerated. Immediately after preparation, the rheology of the sample was measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*.

TABLE 5

Slurry AB Rheological Profile

| | FYSA Readings | | | | | | |
|---|---|---|---|---|---|---|---|
| | 3 | 6 | 100 | 200 | 300 | 3D | 6D |
| Unaccelerated | 2 | 2 | 15 | 36 | 59 | 1 | 1 |
| Accelerated | 1 | 2 | 12 | 28 | 50 | 1 | 1 |

After mixing the two component slurries to activate the set-delayed cement composition, the combined slurry was cured in a 2" by 4" plastic cylinder that was placed in a water bath at between about 90° F. to about 150° F. to form set cylinders. Then the destructive compressive strength (C.S.) was measured using a mechanical press in accordance with API RP Practice 10B-2, *Recommended Practice for Testing Well Cements*. The results of this test are set forth in Table 6 below. The reported compressive strengths are an average for two cylinders of each sample. Compressive strength measurements were taken at 24 hours.

For comparison, a non-two part set-delayed slurry was prepared by combining 350 grams water, 500 grams pumice, 100 grams hydrated lime, 20 grams Micromax® weight additive, 6.25 grams Micro Matrix® cement retarder, and 3.5 grams Liquiment® 5581F dispersant. This slurry (NC1) was aged 35 days prior to use, activated with 10% bwoP $CaCl_2$ solution, and cured in the water baths at the same time as Slurry AB.

TABLE 6

Compressive Strength Tests

| Slurry | Temp. (° F.) | Time (hrs) | C.S. (psi) |
|---|---|---|---|
| AB | 90.0 | 24 | 92 |
| AB (accelerated) | 90.0 | 24 | 105 |
| NC1 | 90.0 | 24 | Fluid* |
| AB | 100.0 | 24 | 98 |
| AB (accelerated) | 100.0 | 24 | 165 |
| NC1 | 100.0 | 24 | Fluid* |
| AB | 120.0 | 24 | 1718 |
| NC1 | 120.0 | 24 | Gel** |
| AB | 140.0 | 24 | 2240 |
| NC1 | 140.0 | — | 431 |
| AB | 150.0 | 24 | 2479 |
| NC1 | 150.0 | — | 802 |

*Slurry remained unset and flowable
**Slurry was gelled and not flowable

As Example 1 shows, slurry AB is more active at lower temperatures than NC1. Without being limited by theory, this effect may be due to the lack of cement retarders in slurry AB and/or the inclusion of a silica additive.

Example 2

In the previous examples the pozzolan and lime slurries were mixed to give a hydrated lime content of 20.0% bwoP. The next example illustrates how it may be advantageous to mix the two parts in different ratios to produce slurries with varying lime content. In this example, 258.8 grams of Slurry B was mixed with 500.0 grams of Slurry A to give a lime content of 40% bwoP:

TABLE 7

Slurry AB Compositional Makeup

| Component | % bwoP |
|---|---|
| Water | 115.0 |
| Pumice | 100.0 |
| Silica Additive | 20.0 |
| Hydrated Lime | 40.0 |
| Weighting Agent | 14.0 |
| Dispersant | 0.93 |

After mixing, this sample was cured in a water bath at 90° F. for 24 hours then crushed to obtain a compressive strength of 150 psi. The strength of this sample was about 33% greater than the sample with only 20% lime content (105 psi).

Example 3

A two part set-delayed cement composition was prepared which comprised the following component slurries:

TABLE 8

| Slurry C Compositional Makeup | | Slurry D Compositional Makeup | |
|---|---|---|---|
| Component | Weight (g) | Component | Weight (g) |
| Water | 325.0 | Water | 350.0 |
| Pumice | 500.0 | Hydrated Lime | 350.0 |
| Weighting Agent | 30.0 | Weighting Agent | 70.0 |
| Dispersant | 3.5 | Dispersant | 2.0 |

Slurry C was prepared in a Waring® blender by first adding water to the blender followed by a dispersant, Liquiment® 5581F dispersant. The dispersant was allowed to fully disperse, then the pumice and a weight additive (MicroMax® FF weight additive) were added. After all of the components were added, Slurry C was blended at a speed of 6000 rpm for 40 seconds to fully homogenize the sample. Slurry D was prepared in the same manner as Slurry C. The calculated density of Slurry C was 13.24 pounds per gallon (ppg) and Slurry B was 12.75 ppg.

Immediately after preparation (designated Day 0) and periodically thereafter, the rheological properties of the samples were determined using a Model 35A Fann Viscometer and a No. 2 spring with a Fann Yield Stress Adapter (FYSA), in accordance with the procedure set forth in API RP Practice 10B-2, *Recommended Practice for Testing Well Cements*. Dispersant was added as needed to maintain adequate viscosity values.

TABLE 9

Slurry C Rheological Profile

| | FYSA Readings | | | | | | Additional Dispersant |
|---|---|---|---|---|---|---|---|
| | 3 | 6 | 100 | 200 | 300 | 3D | 6D | (% bwoP) |
| Day 0 | 3 | 4 | 83.5 | 167 | 251 | 0.5 | 0.5 | — |
| Day 3 | 14.5 | 16.5 | 46 | 75 | 104 | 7 | 8 | — |
| Day 7 | 5 | 8 | 81 | 154.5 | 224 | 1 | 2 | 0.01 |
| Day 40 | 4 | 6.5 | 56.5 | 106 | 154 | 1.5 | 1.5 | 0.02 |

TABLE 10

Slurry D Rheological Profile

| | FYSA Readings | | | | | | | Additional Dispersant |
|---|---|---|---|---|---|---|---|---|
| | 3 | 6 | 100 | 200 | 300 | 3D | 6D | (% bwoHL) |
| Day 0 | 25 | 27 | 41 | 57 | 78 | 10 | 10 | — |
| Day 3 | 21.5 | 23 | 80.5 | 145 | 214 | 12 | 12 | — |
| Day 7 | 22 | 26 | 80.5 | 149.5 | 220 | 12 | 12 | — |
| Day 40 | 3 | 3.5 | 16 | 23 | 30.5 | 2 | 2 | 0.02 |

To form the settable combined slurry, 129.4 grams of Slurry D was added to 500.0 grams of Slurry C. This was performed by adding Slurry C to a Waring® blender set to 4000 rpm and slowly pouring in Slurry D to form Slurry CD with a final slurry composition of:

TABLE 11

Slurry CD Compositional Makeup

| Component | % bwoP |
|---|---|
| Water | 85.0 |
| Pumice | 100.0 |
| Hydrated Lime | 20.0 |
| Weighting Agent | 10.0 |
| Dispersant | 0.80 |

The calculated density of Slurry CD was 13.13 ppg. A portion of Slurry CD was accelerated with 10% bwoP $CaCl_2$ by mixing 200.0 grams of Slurry CD with 21.51 grams of 43% $CaCl_2$ solution. This sample is shown in table 11 as accelerated. Immediately after preparation, the rheology of the sample was measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*.

TABLE 12

Slurry CD Rheological Profile

| | FYSA Readings | | | | | | |
|---|---|---|---|---|---|---|---|
| | 3 | 6 | 100 | 200 | 300 | 3D | 6D |
| Unaccelerated | Slurry was pourable but very thick | | | | | | |
| Accelerated | 7.5 | 8 | 11 | 14 | 21.5 | 3 | 3 |

After mixing the two component slurries to activate the set-delayed cement composition, the combined slurry was cured in a 2" by 4" plastic cylinder that was placed in a water bath at 190° F. to form set cylinders. Then the destructive compressive strength (C.S.) was measured using a mechanical press in accordance with API RP Practice 10B-2, *Recommended Practice for Testing Well Cements*. The results of this test are set forth in Table 12 below. The reported compressive strengths are an average for two cylinders of each sample. The samples and controls were cured at 1 atmosphere, between about 90° F. to about 150° F.; compressive strength measurements were taken at 24 or 48 hours.

For comparison, a non-two part set-delayed slurry was prepared by combining 350 grams water, 500 grams pumice, 100 grams hydrated lime, 20 grams Micromax® weight additive, 6.25 grams Micro Matrix® cement retarder, and 3.5 grams Liquiment® 5581F dispersant. This slurry (NC1) was aged 35 days prior to use, activated with 10% bwoP $C_aCl_2$ solution, and cured in the water baths at the same time as Slurry AB.

TABLE 13

Compressive Strength Tests

| Slurry | Temp. (° F.) | Time (hrs) | C.S. (psi) |
|---|---|---|---|
| CD | 90.0 | 48 | 98 |
| CD (activated) | 90.0 | 48 | 128 |
| NC1 | 90.0 | 48 | Fluid* |
| CD | 100.0 | 48 | 105 |
| CD (activated) | 100.0 | 48 | 216 |
| NC1 | 100.0 | 48 | Fluid* |
| CD | 120.0 | 24 | 78 |
| NC1 | 120.0 | 24 | Gel** |
| CD | 140.0 | 24 | 566 |
| NC1 | 140.0 | 24 | 431 |
| CD | 150.0 | 24 | 710 |
| NC1 | 150.0 | 24 | 802 |

*Slurry remained unset and flowable
**Slurry was gelled and not flowable

Example 4

A two part set-delayed cement composition was prepared which comprised the following component slurries:

TABLE 14

| Slurry E Compositional Makeup | | Slurry F Compositional Makeup | |
|---|---|---|---|
| Component | Weight (g) | Component | Weight (g) |
| Water | 330.0 | Water | 150.0 |
| Pumice | 600.0 | Hydrated Lime | 200.0 |
| Dispersant | 4.5 | Dispersant | 0.7 |

Slurry E was prepared in a Waring® blender by first adding water to the blender followed by a dispersant, Liquiment® 5581F dispersant. The dispersant was allowed to fully disperse, then the pumice was added. After all of the components were added, Slurry E was blended at a speed of 6000 rpm for 40 seconds to fully homogenize the sample. Slurry F was prepared in the same manner as Slurry E. The calculated density of Slurry E was 13.4 pounds per gallon (ppg) and Slurry F was 12.4 ppg. Slurry E and Slurry F were then stored for 48 hours. After 48 hours neither slurry contained free water. However, Slurry F was slightly gelled and required mixing to make it flowable.

At 48 hours, 778.7 grams of Slurry E was added to 175.4 grams of Slurry F. This was performed by adding Slurry E to a Waring® blender set to 4000 rpm and slowly pouring in Slurry F to form Slurry EF. When they were mixed a gel formed and 1.0 gram of dispersant (Liquiment® 5581F dispersant) was added to make the mixture flowable.

TABLE 15

Compositional Mix of Slurry EF
Mix Amount

| | Wt. (g) | Vol. (mL) | Density (ppg) |
|---|---|---|---|
| Slurry E | 778.7 | 484.2 | 13.4 |
| Slurry F | 175.4 | 118.1 | 12.4 |

The calculated density of the final slurry was 13.2 ppg. 15.0 grams of $C_aCl_2$ powder (2.5% bwoP+HL) was added to the final slurry before placing it in a consistometer. The thickening time was measured as 5:38 hours at 140° F. and 3000 psi. The thickening time was measured using a high-temperature high-pressure consistometer in accordance with the procedure for determining cement thickening times set forth in API RP Practice 10B-2, *Recommended Practice for Testing Well Cements*, First Edition, July 2005.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
    providing a pozzolan slurry comprising a pozzolan and water; wherein the water is present in the pozzolan slurry in an amount of about 33% to about 200% by weight of the pozzolan;
    providing a lime slurry comprising hydrated lime and water; wherein the lime is present in the lime slurry in an amount of about 10% to about 100% by weight of the amount of pozzolan present in the pozzolan slurry;

wherein the water is present in the lime slurry in an amount of about 33% to about 200% by weight of the lime;

allowing the pozzolan slurry and the lime slurry to remain separate for about one day or longer;

mixing the pozzolan slurry and the lime slurry to form a cement composition on a surface not within a subterranean formation or mixing the pozzolan slurry and the lime slurry to form a cement composition within a subterranean formation;

placing the cement composition into a subterranean formation; and allowing the cement composition to set in the subterranean formation in which the cement composition was placed.

2. The method of claim 1 wherein the pozzolan is selected from the group consisting of fly ash, silica fume, metakaolin, pumice, and any combination thereof.

3. The method of claim 1 wherein at least one of the pozzolan slurry, the lime slurry, or the cement composition further comprises a dispersant.

4. The method of claim 3 wherein the dispersant comprises at least one dispersant selected from the group consisting of a sulfonated-formaldehyde-based dispersant, a polycarboxylated ether dispersant, and any combination thereof.

5. The method of claim 1 wherein at least one of the pozzolan slurry, the lime slurry, or the cement composition further comprises a cement set retarder.

6. The method of claim 5 wherein the cement set retarder is selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof.

7. The method of claim 1 wherein at least one of the pozzolan slurry, the lime slurry, or the cement composition further comprises a cement set activator; wherein the cement set activator comprises at least one cement set activator selected from the group consisting of an amine, a silicate, zinc formate, calcium acetate, a Group IA hydroxide; a Group IIA hydroxide, a monovalent salt, a divalent salt, nanosilica, a polyphosphate, and any combination thereof.

8. The method of claim 1 further comprising storing at least one of the pozzolan slurry or the lime slurry for a time period of about 7 days or longer prior to the step of mixing.

9. The method of claim 1 further comprising pumping the cement composition through a feed pipe and into a wellbore annulus that is penetrating the subterranean formation.

10. The method of claim 1, wherein the pozzolan slurry and the lime slurry are mixed on the surface to form the cement composition.

11. A method of displacing a fluid in a subterranean formation comprising:

providing a pozzolan slurry comprising a pozzolan and water; wherein the water is present in the pozzolan slurry in an amount of about 33% to about 200% by weight of the pozzolan;

providing a lime slurry comprising hydrated lime and water; wherein the lime is present in the lime slurry in an amount of about 10% to about 100% by weight of the amount of pozzolan present in the pozzolan slurry; wherein the water is present in the lime slurry in an amount of about 33% to about 200% by weight of the lime;

introducing a first portion of the pozzolan slurry into a wellbore that penetrates a subterranean formation such that the first portion of the pozzolan slurry displaces at least one fluid from the wellbore;

mixing a second portion of the pozzolan slurry and at least a portion of the lime slurry to form a cement composition, wherein the second portion of the pozzolan slurry and the portion of the lime slurry are mixed on a surface not within the subterranean formation or mixing the second portion of the pozzolan slurry and the portion of the lime slurry to form a cement composition within a subterranean formation;

placing the cement composition into a subterranean formation; and allowing the cement composition to set in the subterranean formation in which the cement composition was placed.

12. The method of claim 11 wherein the pozzolan is selected from the group consisting of fly ash, silica fume, metakaolin, pumice, and any combination thereof.

13. The method of claim 11 wherein the first portion of the pozzolan slurry that displaces at least one fluid from the wellbore is foamed prior to displacing at least one fluid from the wellbore.

14. The method of claim 11 wherein at least one of the pozzolan slurry, the lime slurry, or the cement composition further comprises a dispersant.

15. The method of claim 11 wherein at least one of the pozzolan slurry, the lime slurry, or the cement composition further comprises a cement set retarder.

16. The method of claim 11 further comprising pumping the cement composition through a feed pipe and into a wellbore annulus that is penetrating the subterranean formation.

17. The method of claim 11, wherein the second portion of the pozzolan slurry and the portion of the lime slurry are mixed on the surface to form the cement composition.

18. A system for cementing in a subterranean formation comprising:

a pozzolan slurry comprising a pozzolan and water: wherein the water is present in the pozzolan slurry in an amount of about 33% to about 200% by weight of the pozzolan;

a lime slurry for combination with the pozzolan slurry to form a cement composition, wherein the lime slurry comprises hydrated lime and water; wherein the lime is present in the lime slurry in an amount of about 10% to about 100% by weight of the amount of pozzolan present in the pozzolan slurry; wherein the water is present in the lime slurry in an amount of about 33% to about 200% by weight of the lime; and mixing equipment capable of mixing the pozzolan slurry and the lime slurry.

19. The system of claim 18 wherein the mixing equipment comprises a jet mixer capable of continuously mixing the pozzolan slurry and the lime slurry to form a composition as the pozzolan slurry and the lime slurry are pumped into the subterranean formation or a batch mixer capable of mixing the pozzolan slurry and the lime slurry to form a cement composition on a surface not within the subterranean formation; and wherein the system further comprises pumping equipment for delivering the cement composition into a wellbore.

20. A method of cementing in a subterranean formation comprising:

providing a pozzolan slurry comprising a pozzolan and water;

providing a lime slurry comprising hydrated lime and water;

allowing the pozzolan slurry and the lime slurry to remain separate for about one day or longer;

mixing the pozzolan slurry and the lime slurry to form a cement composition on a surface not within a subterranean formation or mixing the pozzolan slurry and the lime slurry to form a cement composition within a subterranean formation; wherein the cement composition comprises a cement set retarder comprising a phosphonic acid derivative, and wherein the cement composition further comprises a dispersant comprising a polycarboxylated ether dispersant;

placing the cement composition into a subterranean formation; and allowing the cement composition to set in the subterranean formation in which the cement composition was placed.

21. The method of claim 20 wherein the pozzolan is selected from the group consisting of fly ash, silica fume, metakaolin, pumice, and any combination thereof.

22. The method of claim 20 wherein at least one of the pozzolan slurry, the lime slurry, or the cement composition further comprises a cement set activator; wherein the cement set activator comprises at least one cement set activator selected from the group consisting of an amine, a silicate, zinc formate, calcium acetate, a Group IA hydroxide; a Group IIA hydroxide, a monovalent salt, a divalent salt, nanosilica, a polyphosphate, and any combination thereof.

23. The method of claim 20 further comprising storing at least one of the pozzolan slurry or the lime slurry for a time period of about 7 days or longer prior to the step of mixing.

* * * * *